(12) United States Patent
Fickie et al.

(10) Patent No.: US 8,175,987 B2
(45) Date of Patent: May 8, 2012

(54) METHOD AND APPARATUS FOR COMPUTING A CHANGE PLAN USING GENETIC PROGRAMMING AND PARSE TREE

(75) Inventors: Kenneth Edward Fickie, Ashland, MA (US); Sesh Jalagam, Santa Clara, CA (US); Amanuel Ronen Artzi, Framingham, MA (US); Rony R. Baenziger, Palm Coast, FL (US)

(73) Assignee: EMC Corporation, Hopkinton, MA (US)

( * ) Notice: Subject to any disclaimer, the term of this patent is extended or adjusted under 35 U.S.C. 154(b) by 1073 days.

(21) Appl. No.: 12/058,854

(22) Filed: Mar. 31, 2008

(65) Prior Publication Data

US 2009/0248597 A1    Oct. 1, 2009

(51) Int. Cl.
*G06N 3/00* (2006.01)
(52) U.S. Cl. .......................... 706/13; 709/223
(58) Field of Classification Search ............. 706/13; 709/223

See application file for complete search history.

(56) References Cited

U.S. PATENT DOCUMENTS

| 7,016,882 B2* | 3/2006 | Afeyan et al. ............ 706/13 |
| 2005/0183073 A1* | 8/2005 | Reynolds ............ 717/141 |
| 2008/0109392 A1* | 5/2008 | Nandy ............ 706/47 |

* cited by examiner

*Primary Examiner* — Jeffrey A Gaffin
*Assistant Examiner* — Mai T Tran
(74) *Attorney, Agent, or Firm* — Krishnendu Gupta; Gerald P. Kazanjian

(57) ABSTRACT

A method, and computer program product for computing a change plan are presented. A model of a current configuration is identified, the model including modeled system assets and modeled tasks. A request to change the current configuration to a new configuration is received. The request to change the current configuration to generate a plurality of valid strategies to be used in a genetic programming parse tree corresponding to modeled assets and modeled tasks of said model is applied to the model. The request to change the current configuration is applied to at least one of said valid strategies to generate a plurality of potential change plans. The change plans are evolved according to genetic programming principles to a preferred change plan.

19 Claims, 14 Drawing Sheets

METHOD AND APPARATUS FOR COMPUTING A CHANGE PLAN USING GENETIC PROGRAMMING AND PARSE TREE

BACKGROUND

The rapid expansion of information service and data processing industries has resulted in a need for computer systems to manage more and more resources. One example of resource management involves managing a storage area network (SAN). A SAN is a collection of data storage systems that are networked with a number of host computer systems that operate as servers to access data stored in the data storage systems. Other examples include resource management involving the meeting of Service Level Agreements (SLAs), security requirements, Quality of Service (QoS) guarantees for different types of data flowing through a network, fault tolerance requirements for providing system integrity, redundancy requirements and content management requirements. A change in any type of resource including it relation to other resources, be it system infrastructure, content or personnel is preferably implemented in the most cost-efficient manner. Resource management can be applied to existing resources for things like managing the life cycle of certain devices, adding resources and removing resources. Resource management can include any type of resource including people.

Referring back to the example of a storage area network, elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A storage area network may undergo changes as needs of its users change. A typical change may be a provisioning change wherein a certain amount of storage, having certain characteristics, may need to be allocated. Traditionally, a rule-based system is used to execute the provisioning request.

SUMMARY

Conventional mechanisms such as those explained above suffer from a variety of deficiencies. One such deficiency has to do with managing resources. Currently, a request to change a configuration is addressed by applying the request to a rule-based system. The rules for the rule-based system are typically human-generated so that an expert is required to provide the rules or best practices to use in generating the rules. Further, the rule based system is deterministic in that the rules are required and need to be known before the problem can be addressed, which may require prior knowledge of the current storage network configuration. The rule-based system may find suboptimal solutions or no solution at all, especially if all the rules in play are not discovered beforehand. This may also prove to be a difficult, if not impossible task, if the system becomes very large. Once the process is started, if somehow the environment changes, the process must be stopped and then restarted from the beginning, which is one reason the system is not adaptive. Further, the rule-based system is non-adaptive to change and is limited by scale and complexity. As the scale (topology) grows, the complexity increases, and the rules may need to be changed accordingly if they are known beforehand.

Embodiments of the invention significantly overcome such deficiencies and provide mechanisms and techniques that utilize a genetic programming model to generate one or more optimal change plans for managing resources. By incorporating a genetic programming model a preferred change plan is obtained which is probabilistic, requires no explicit knowledge, no formal search logic, is resilient to changes in environment, and is adaptive to external perturbations to the system. The genetic programming solution is also amenable to large-scale problems and can be declarative.

In a particular embodiment of a method of computing a change plan, the method includes identifying a model of a current configuration, the model including modeled system assets, modeled tasks and modeled relations between entities. The method also includes receiving a request to change the current configuration to a new configuration and applying the request to change the current configuration to generate a plurality of valid strategies to be used in a genetic programming parse tree corresponding to modeled assets and modeled tasks of the model. The method further includes applying the request to change the current configuration to at least one of the valid strategies to generate a plurality of potential change plans. Further, the method includes evolving, according to genetic programming principles, between at least two of the plurality of change plans to a preferred change plan or set of change plans.

Other embodiments include a computer readable medium having computer readable code thereon for computing a change plan. The computer readable medium includes instructions for identifying a model of a current configuration, the model including modeled system assets and modeled tasks. The computer readable medium also includes instructions for receiving a request to change the current configuration to a new configuration and instructions for applying the request to change the current configuration to generate a plurality of valid strategies to be used in a genetic programming parse tree corresponding to modeled assets and modeled tasks of the model. The computer readable medium further includes instructions for applying the request to change the current configuration to at least one of the valid strategies to generate a plurality of potential change plans. Further, the computer readable medium includes instructions for evolving, according to genetic programming principles, between at least two of the plurality of change plans to a preferred change plan or set of change plans Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that computes a change plan as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for computing a change plan as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC, Inc., of Hopkinton, Mass.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

By way of embodiments of the present invention, resources and tasks are combined in such a way using genetic programming to create a change plan to a requested change in an optimal fashion. Given a model environment, a target objective, costs for tasks and resources, and user supplied constraints on the resources, multiple possible solutions for a change request are automatically generated, without human guidance. By use of genetic programming techniques and principles of Darwinian evolution, a preferred solution is determined from the multiple possible solutions.

While a storage area network is used by means of example to explain concepts of the present invention, it should be appreciated that other types of systems, resources, personnel and infrastructure are also applicable and the invention should not be limited to only storage area networks. For example, the present invention is useful in providing a change plan for a storage area network in response to a provisioning request.

Other examples include building a system from ground zero wherein a list of resources is provided. A plan is generated (a change plan changing from an empty configuration to a system configuration) to build a system and a purchase plan is developed. In another example, the present invention is utilized when a resource may be the cause of a compliance violation and a change plan is developed that corrects the compliance violation. The violation is translated into the request for targets and constraints which are then used to evolve to the remediation plan. Another example would be a resource causing an error in a system and a change plan is developed to compensate for or overcome the error. Other examples include a device or resource causing the system to fail to meet a Service Level Agreement, a Quality of Service level, or a fault tolerance requirement. Still other embodiments include developing a change plan for responding to life cycle requirements of managed resources, for adding resources, for removing resources, for migrating data from one resource to another resource, to optimizing resources across the system (e.g., cost, performance . . . ), for provisioning of an application or application requirements, and to provision a virtual machine in a virtualized environment including assigning compute, memory, and capacity.

Figure 1:
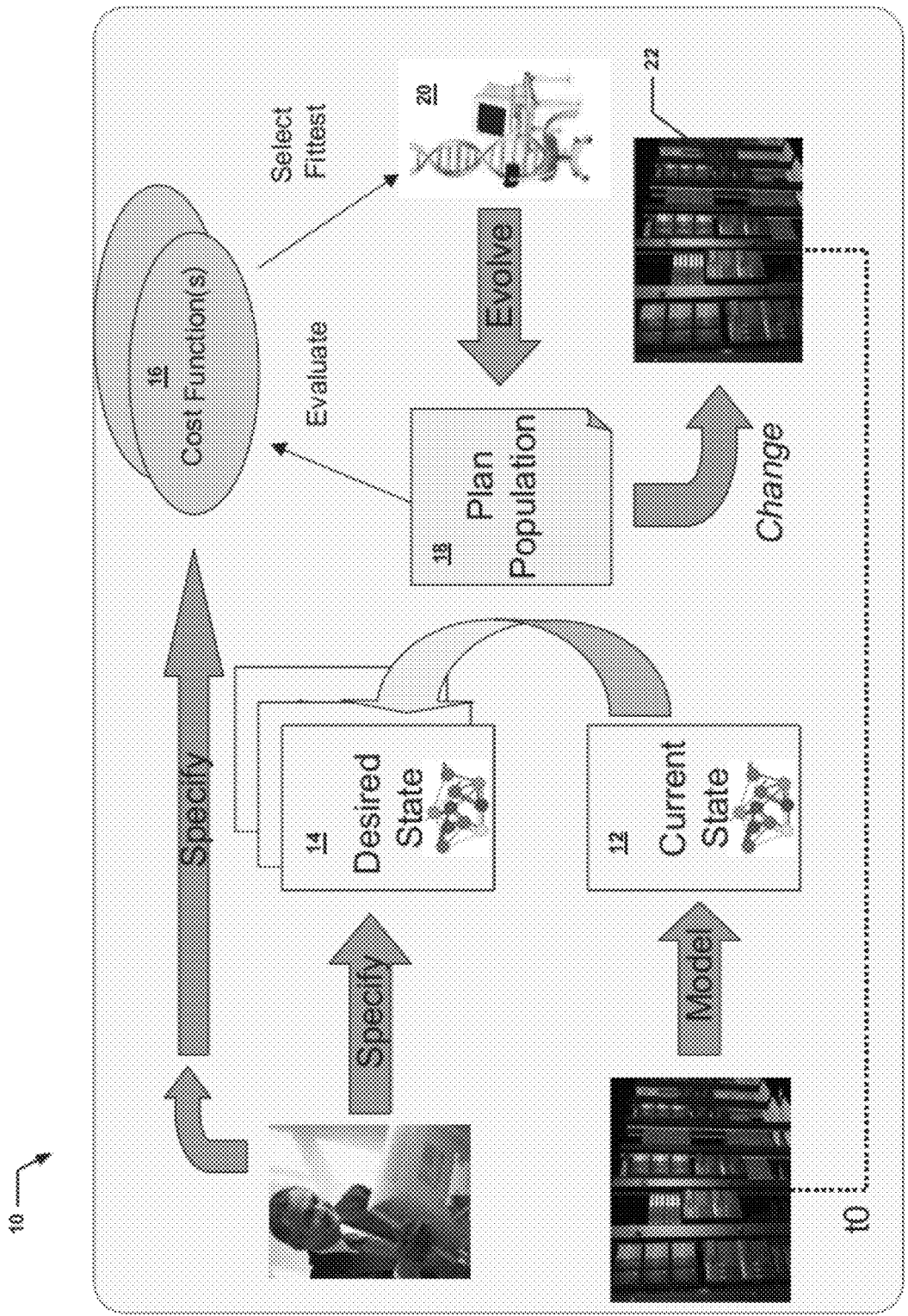
FIG. 1 is a high-level diagram of the process for computing a change plan using genetic programming in accordance with embodiments of the invention.
Figure 3:
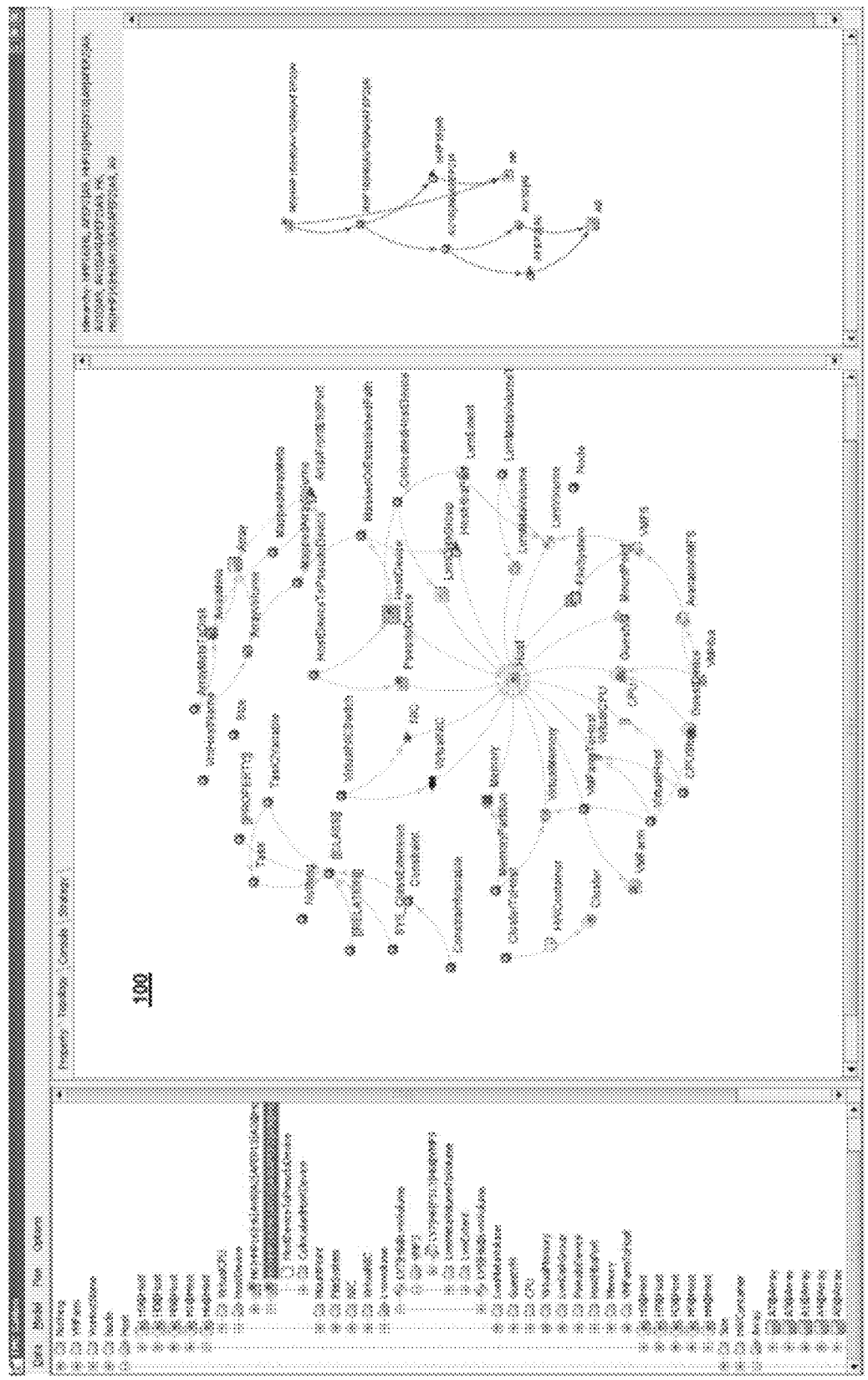
FIG. 3 is a screen shot of a model of an environment.

Referring now to FIG. 1, a block diagram of an environment 10 showing how a change plan can be computed is presented. A model 12 of the current state of the system configuration is shown. The model may be an abstract model that represent types of entities and relations between them and possibly other meta model information to the topology which is the instantiation of the described model to represent the current state of the system. The model 12 (an example is shown in FIG. 3) includes modeled storage assets such as processors, switches, hosts, storage arrays and the like. The model 12 also includes the interconnect between the various modeled storage assets, such that paths between different assets can be viewed at a high level. This is not the physical path between the devices, but a relationship path that shows how one end of the path (Array Volume) is related to the other (Host). The model 12 may observe a certain hierarchy, for example, a path can begin at a host and traverse to a host device, then to a masked or established path, then to a mapped array volume, to an array volume, and finally to an array.

A user specifies a desired state 14 of the system configuration. For a storage area network, this may take the form of a provisioning request. For example, a provisioning request may take the form of "optimally assign 30 GBytes of storage of a given quality to a host". The provisioning request, when implemented, will cause a change in state of the model from the current storage area network configuration to the new storage area network configuration which now incorporates the provisioning request as part of the model. Another type of request utilized with storage area networks would be a resource management request wherein an optimal plan for the provisioning of an application is developed. Resource management can be applied to existing resources for things like managing the life cycle of certain devices, adding resources and removing resources. Resource management can include any type of resource including people. Still another type of request for a storage area network could be a data migration plan, wherein a change plan is developed in order to determine an optimal way to migrate data from one resource to another.

Valid tree building is accomplished as the result of the structural constraints imposed by the model. Detailed plans (individuals) are built by supplying model instances randomly or semi-randomly.

Cost functions 16 associated with the model of the storage network configuration are specified. The cost functions are user-defined and can include the cost of certain storage network assets, the cost of administrating the storage network, as the cost of changing the storage network configuration, the cost of personnel, performance related costs, capital equipment costs, impact costs, labor costs, material costs, opportunity costs and various other costs. Cost functions can be utilized which incorporate various combinations of costs. Different costs can have different weights according to different cost functions. Once the desired cost function is established, this cost function is used to evolve between potential change plans to determine an optimal change plan or set of change plans. The cost may also be considered a structural constraint, wherein classes of objects are related to other classes. In one embodiment, costs are associated with individual resources and tasks. These can be variable depending on not only the type of resource, but by the properties of the resource instance. Similarly the cost for a task can depend on the instances input into it. Total cost of a plan is found by evaluating the function, moving from the terminals to the root.

The goal is to evolve a set of plans to migrate from a current system configuration to a desired system configuration, subject to costs and a set of conditions or policies, called constraints. There may be two types of constraints. One type is known as user-provided restrictions on selection, referred to as extrinsic constraints. These extrinsic constraints can include the meeting of Service Level Agreements (SLAs), security requirements, Quality of Service (QoS) guarantees for different types of data flowing through a network, fault tolerance requirements for providing system integrity, redundancy requirements and content management requirements. For example, an extrinsic constraint may be that an Array Volume must have a quality of service of GOLD, or that an array must be a particular array or that the array must have an array size greater than a predetermined amount. The constraints may be used to filter the result set, such that an optimal plan or plans can be achieved in the least amount of time and involving the least amount of processing.

The other type of constraint is constraints on resources, referred to as intrinsic constraints or model constraints. Intrinsic constraints are model integrity constraints that can be specified on model resources or tasks. An intrinsic constraint relates how instances are placed in the model. An example of this is a Map task that can only map an Array Volume to an Array Front End Port from the same Array. The equivalent concept in SQL is a "check" conditions. For example, a model constraint says an ArrayMetaVolume and an ArrayVolume must belong to an Array. The model constraint says that an array volume instance and the meta volume to which it is associated must both belong to the same array instance. Model constraints are more universal and embedded as part of the meta model. They would not be altered by a user directly.

Constrained selection looks at the terminal types of the given strategies, and combines the intrinsic constraints associated with them to generate a highly filtered result set where chances of creating usable instances in the Genetic Programming (GP) algorithms is increased. Constrained selection may be used in order to create a starting working space. A random selection of instances from a large collection of instances may be used to begin the process and to streamline the process.

For a model containing resources and tasks, valid strategies (tree with nodes that are variables) can be randomly generated using self-organization principles implied with strongly typed genetic programming. When these strategies are evaluated, they become individuals to be evolved. Evaluating a strategy could be as simple as randomly picked filtered instances from the topology of the correct type and supplying them as evaluations to the variables that are the nodes of the tree. Filtering these values is done using extrinsic constraints.

The process starts and a "population" 18 of "plans" is created. A population is a collection of plans, wherein each plan is a potential solution to the request. The plans will evolve over time using Darwinian principles (survival of the fittest). After a certain amount of evolving (shown as box 20), a set of plans that best meet the objective (minimize cost, time to implementation, impact on business and so on) are produced. Once the optimal plan is achieved, it can be implemented in the most cost-effective manner, that is the change is implemented to provide an updated system 22 which meets all the requirements.

Figure 2:
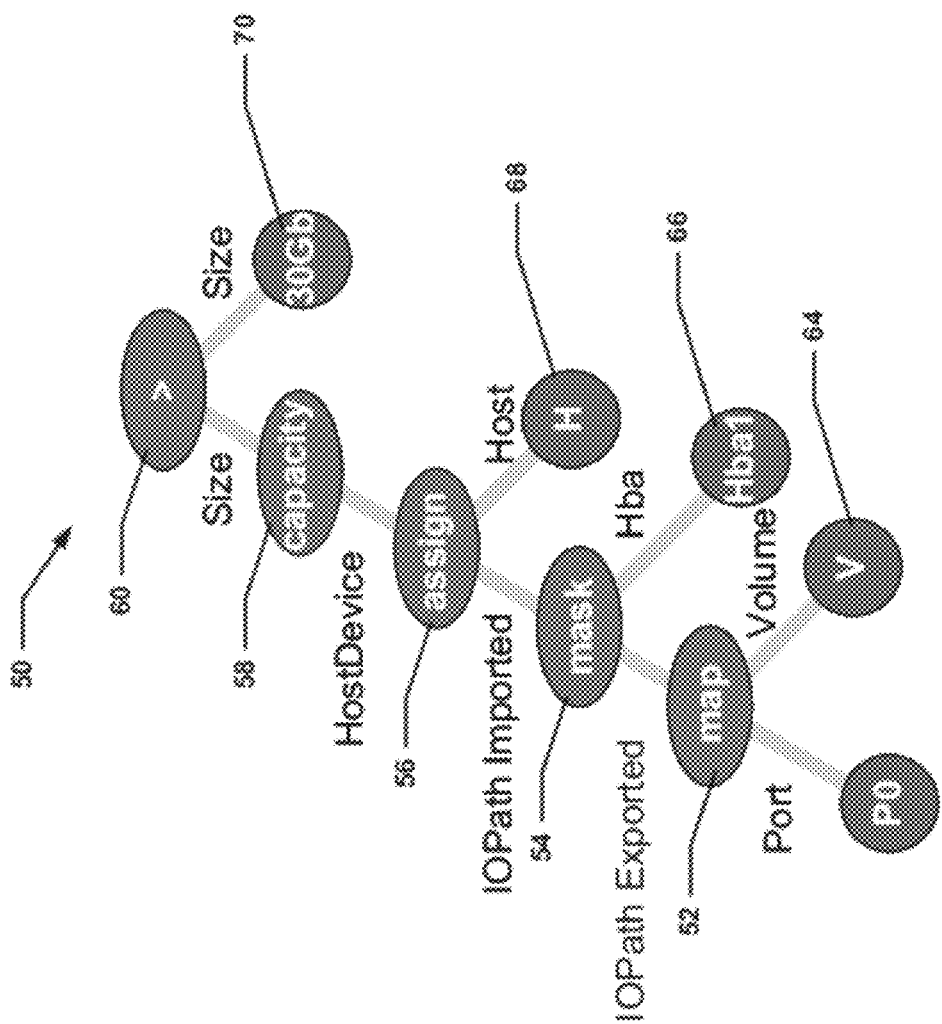
FIG. 2 is a diagram of a plan description depicted as a genetic programming parse tree.

Referring now to FIG. 2, an example of a plan is shown as a genetic programming parse tree 50. This also shows Strongly Typed Genetic Programming, in the sense only the allowed types can be inputs to a task and a task can output a different type of object/resource than it takes in. The circles (62, 64, 66, 68, 70) represent modeled instances. The ovals (52, 54, 56, 58 and 60) represent atomic operations that either act directly on those instances or on output instances of previous atomic operations and as modeled instances that result from the actions. The plan 50 can be read as follows. Starting at the bottom, a port (P0) and a volume (V) are mapped at operation 52 to provide an exported IO Path. The exported IO Path and Hba device (Hba1) are masked at operation 54 to produce an imported IO path. The imported IO path is assigned to a host (H) at operation 56 to provide a Host Device 68, the host device having a capacity of 30 GB.

A user may provide restrictions referred to as intrinsic constraints. For example, a user may specify a request for 30 gigabytes (GB) of storage and that the 30 GB of storage be the highest quality storage (high speed, backed up daily, etc.) or must be from a particular array. There may also be constraints on the instances of the classes. For example, a user may request that two volumes be concatenated to form a metavolume, the volumes must be on the same array, so the intrinsic constraint is that the two volumes to be concatenated need to be on the same array.

It should be noted that the result of this operation is not just a new configuration that is responsive to the request, but also the plan on how to achieve the end result. For example, if the request is to allocate 30 GB of high quality storage to a host, the result not only identifies the storage to be allocated, but how the storage is arrived at which is the ordered set of tasks and objects involved in achieving the plan(s) and also with knowledge of the value of the objective function select to be used. In such a manner, a best plan to meet the objective (minimize cost, minimize time to implementation, minimize impact on business and the like) is determined.

Referring now to FIG. 3, an example model 100 of a compute data center environment that includes SAN and server virtualization layer is shown. This model is referred to as a Generalized Virtualizer Generic Data Path (GDP) model and is described in co-pending application U.S. Ser. No. 12/059,410, filed on even date herewith, the disclosure of which is incorporated by reference in its entirety. The model 100 includes a host located at the center of the model. Also shown are attached devices, paths, mapped volumes, array volumes and arrays.

Figure 4:
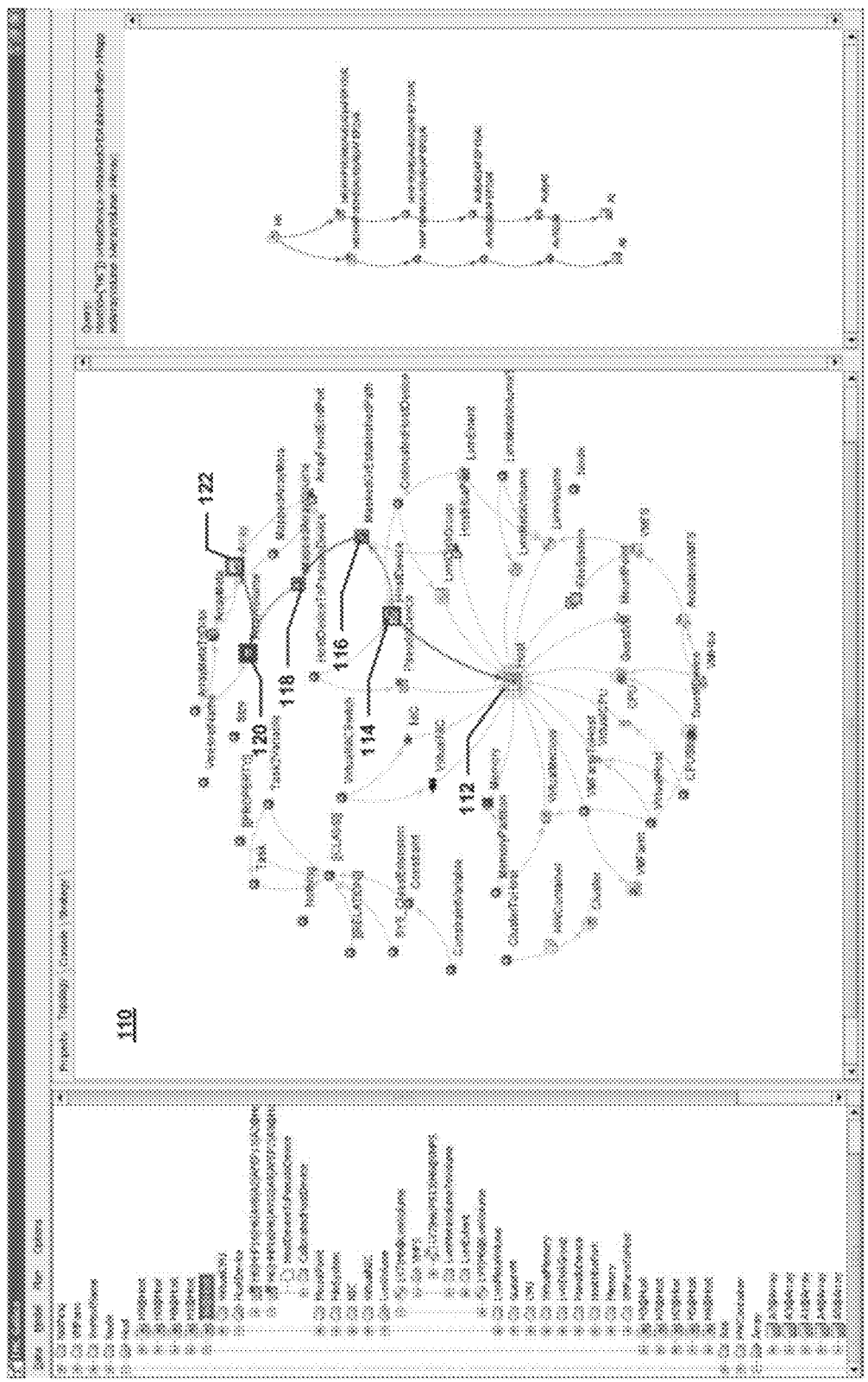
FIG. 4 is a screen shot of a model of an environment with a path from a first entity to a second entity highlighted.

FIG. 4 shows a model 110 of a compute data center environment that includes SAN and server virtualization layer, wherein a target (Array 122) has been specified. On the left side is a model in the terms of classes and relationships and modeled relationships paths between them—the right side is an instantiated topology from a specific Host H6@Host selected at the tree on the left.

The target may be the cause of a compliance violation and require a change plan be developed that corrects the compliance violation. The target could also be an error detected in a network and require a change plan to compensate for or overcome the error. Other examples of a target include a device or resource causing the system to fail to meet a Service Level Agreement, a Quality of Service level, a fault tolerance requirement or the like, all requiring a change plan to address the problem and to correct the problem. The target could also be the result of a resource management policy such as a life cycle determination that a managed resource should be replaced or removed or that an application using this resource needs to be relocated to another device or that data residing on the resource needs to be relocated to another resource.

In this example, the darker lines are used to show the path from Host 112 to specified target Array 122. The path traverses from Host 112 to HostDevice 114, then to MaskedOrEstablishedPath 116, onto MappedArrayVolume 118, to ArrayVolume 120 and finally to Array 122.

Figure 5:
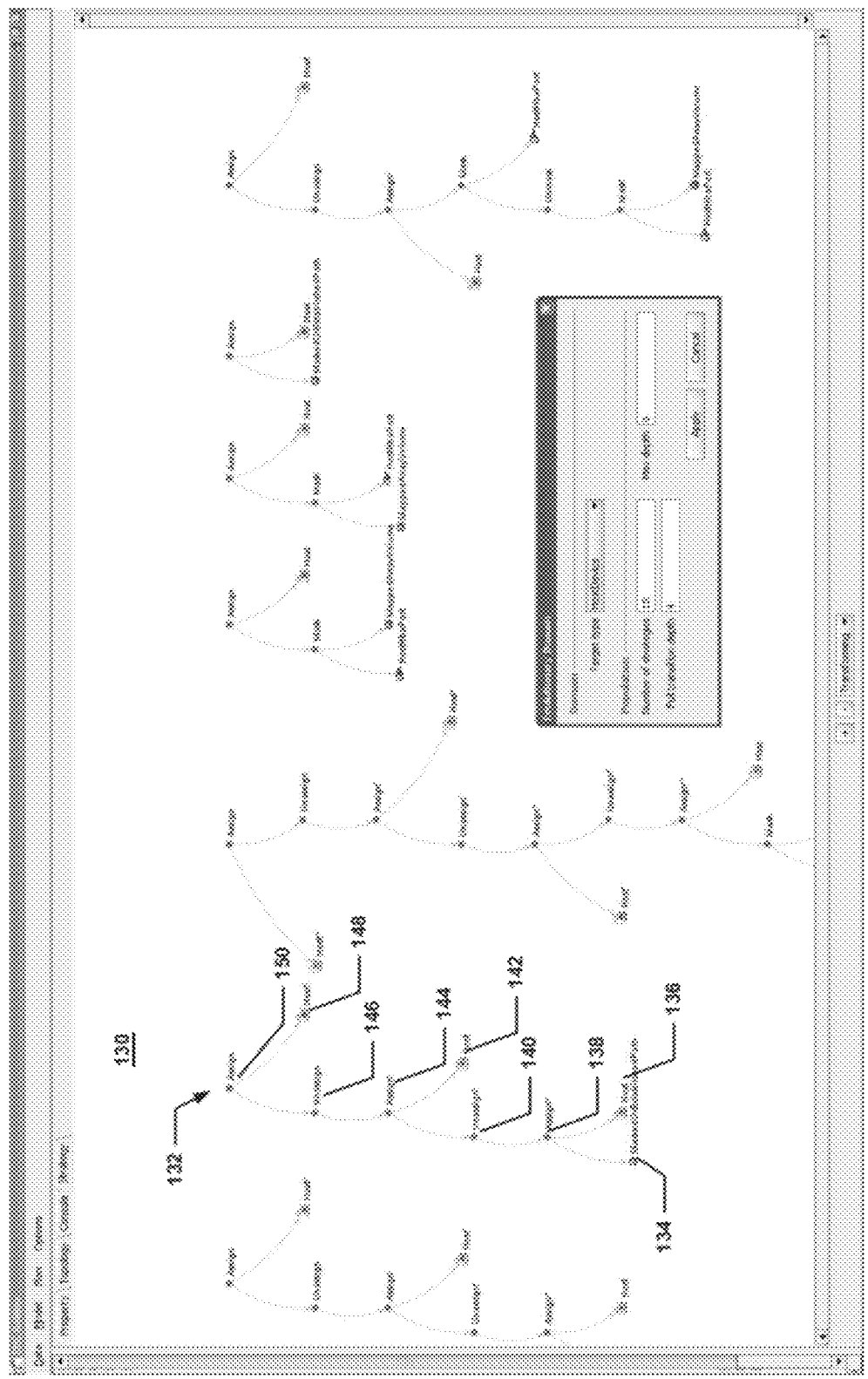
FIG. 5 is a screen shot showing different strategies for a particular target.

FIG. 5 is a screen shot 130 showing a plurality of different strategies for defining a plan to the target. These are each read from the bottom up. For example strategy 132 begins at the bottom where a MaskedOrEstablishedPath 134 is assigned (operation 138) to a Host 136 which would provide a Host Device. The Host Device is then unassigned (operation 140). Then the MaskedOrEstablishedPath is assigned (operation 144) to host 142 producing a new Host Device. The Host Device is then unassigned (operation 146). Then the MaskedOrEstablishedPath is assigned (operation 150) to host 148 producing a new Host Device. Constrained selection may be used here in order to create a starting working space. A random selection of instances from the large collection of instances may be used to begin the process and to streamline the process.

The model evolves from a population of plans to a new population of plans taking into account a cost function. The user-defined costs include the cost associated with certain tasks, as well as the costs associated with certain resources. Table 1 shows an example of typical costs.

TABLE 1

| Operation | Cost |
| --- | --- |
| Configure a storage volume from raw disk | 4 m |
| Map a storage volume to an array port | 2 m |
| Zone a storage port | 30 s |
| Zone a host port | 30 s |
| Host IO scan | 30 s |

These costs are utilized in the evolving between generations of populations of plans to arrive at a preferred solution as the preferred solution comprising the plan having a lowest associated cost. The cost functions utilized by the process are user-defined and can include the cost of personnel, performance related costs, capital equipment costs, operational costs, impact costs, labor costs, material costs, opportunity costs and various combinations. Different costs can have different weights according to different cost functions. Cost functions could also be defined as objective functions as they define objective dimensions toward which the algorithm is trying to optimize. While cost implies something to minimize, in other embodiments it may be desirable to maximize a function, for example fitness, which is the inverse of cost.

While the process for generating a change plan has been described utilizing a single change request, the present invention should not be limited to generating a change plan for a single request. Multiple simultaneous change requests can be executed and an optimal change plan generated based on the combined requests, as opposed to handling multiple requests one at a time. As a result a different optimal change plan may be derived by executing multiple change requests together, as opposed to an optimal change plan that would be arrived at had each change request been handled individually.

Figure 6:
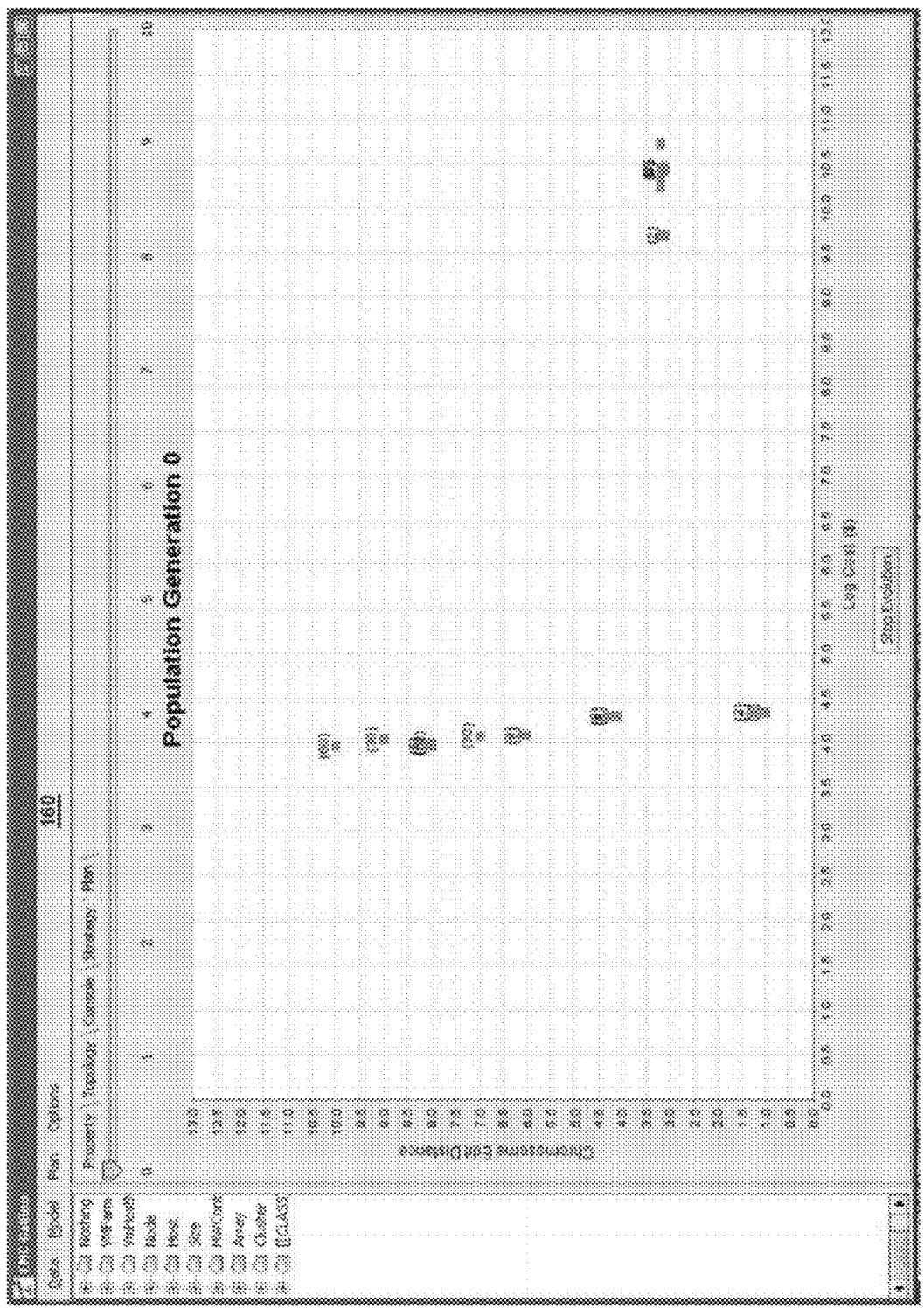
FIG. 6 is a screen shot showing a first generation of plans (solutions) to the change request and their associated costs in accordance with embodiments of the invention.

Referring now to FIG. 6, a screen shot 160 showing the first generation (population) of detailed plans are shown with their associated costs. Some of the plans have greatly different costs associated therewith. Any one of the plans are capable of accomplishing the request, the point is to determine a lowest cost (optimal) plan for implementing the change request. As can be seen here, there are several plans having a cost around the 4.0 to 4.5 mark to implement, while there also exists some plans having a cost around the 9.5 to 11.0 mark to implement. On one method, the higher cost plans are dismissed, and evolving can continue between the other plans (Darwinian survival of the fittest) to determine a next generation of plans. While it is favorable to use the most fit individuals, a few unfit ones may be allowed to procreate so that the population is sufficiently robust to find the global optimum. The concept of evolving between plans will be discussed in detail below.

Figure 7:
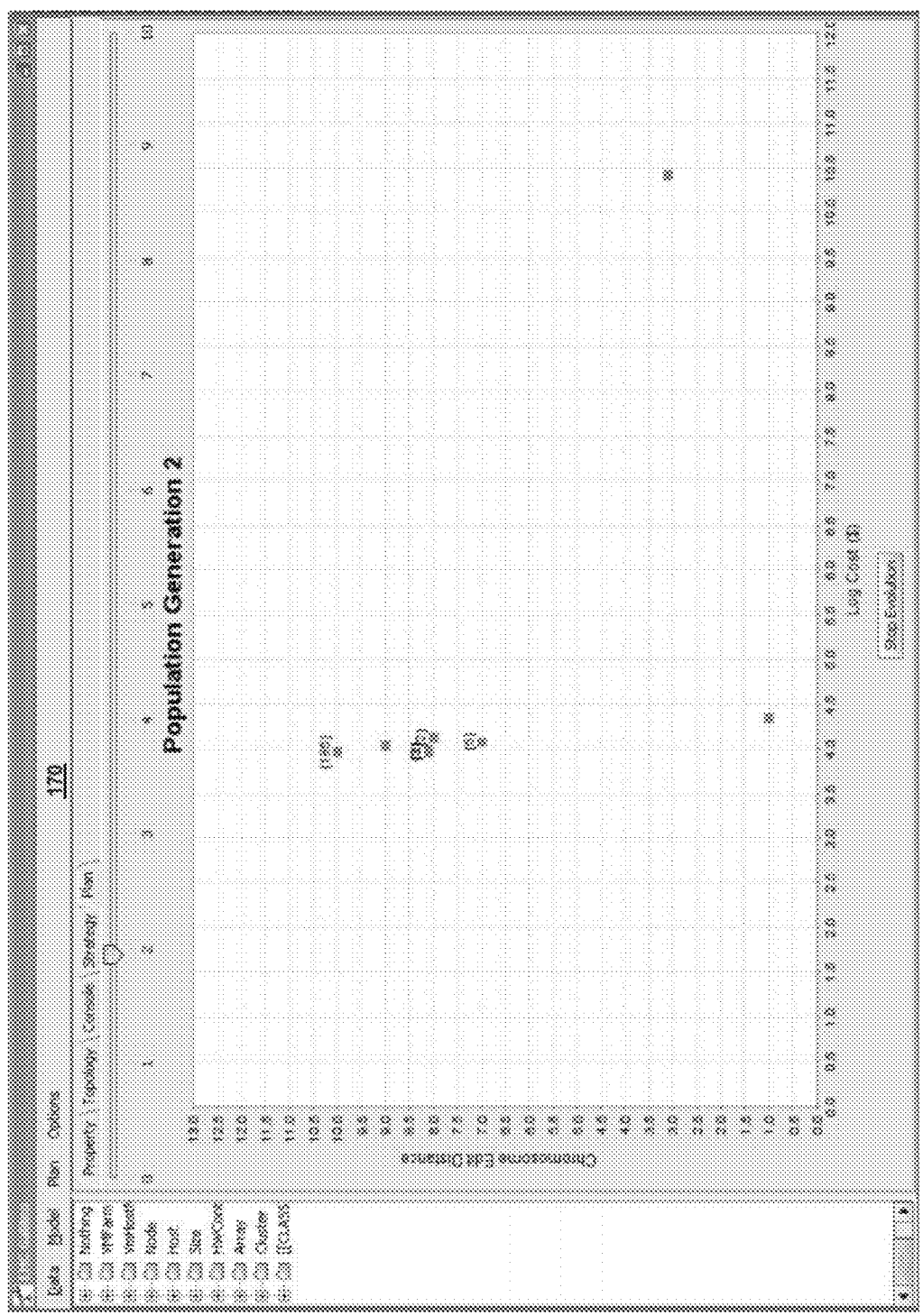
FIG. 7 is a screen shot showing a second generation of plans (solutions) to the change request and their associated costs after one stage of evolving in accordance with embodiments of the invention.
Figure 8:
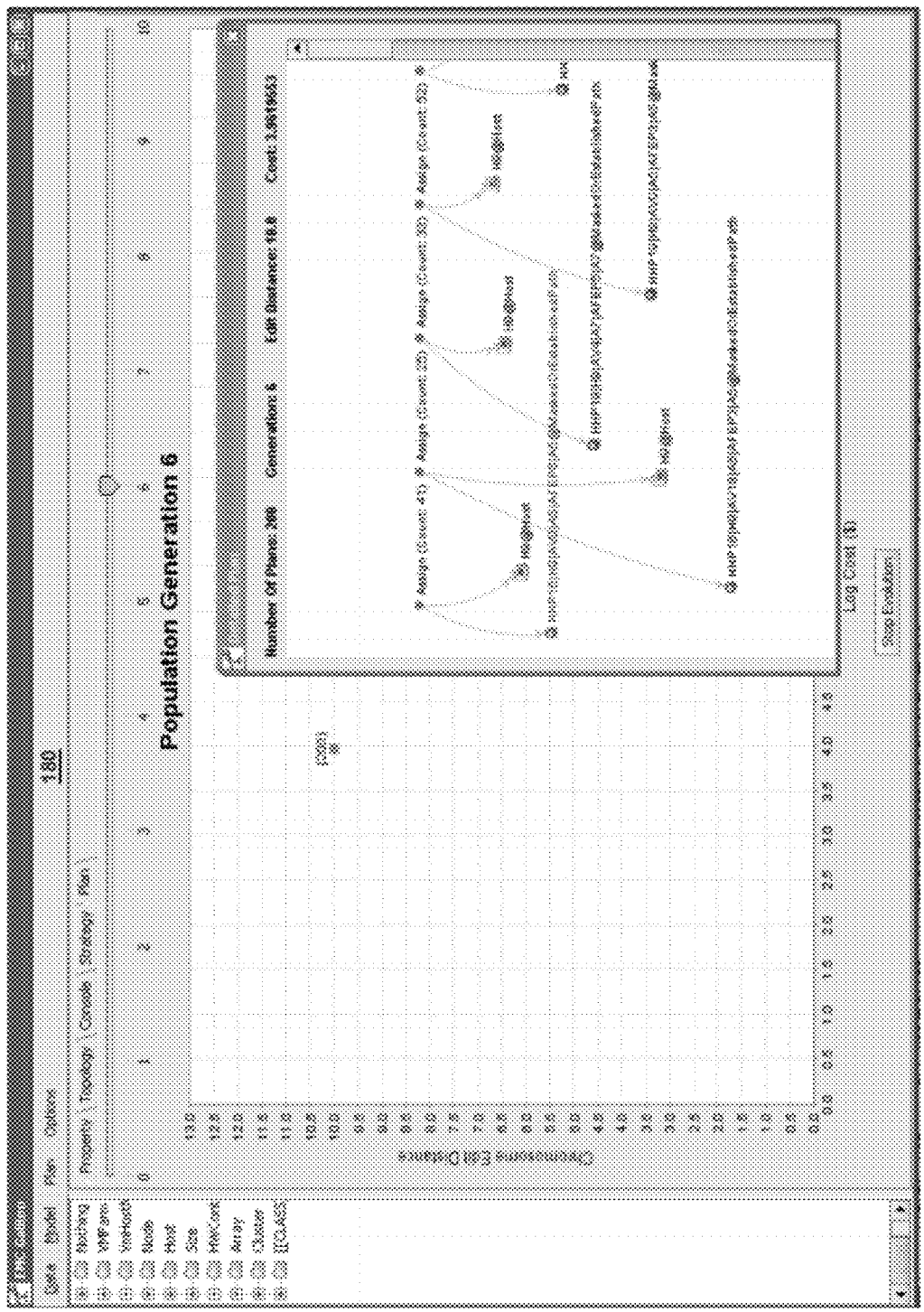
FIG. 8 is a screen shot showing a final generation of plans (solutions) to the change request and their associated costs after evolving to a converged solution in accordance with embodiments of the invention.

The evolving takes place using some of the plans of FIG. 6, and as shown in the screen shot 170 of FIG. 7, the number of plan around the higher costs in the second generation of the population is reduced (convergence starting to take place). One of the plans still has a greatly different cost associated therewith. As can be seen here, there are several plans having a cost around the 4.0 mark to implement, while there also exists one other plan having a cost around the 10.5 mark to implement. In one embodiment, the higher cost plan will be dismissed, and evolving can continue between the other plans. Other embodiments include using the most fit individuals, but allowing a few unfit ones to procreate so that the population is sufficiently robust to find the global optimum.

Figure 9:
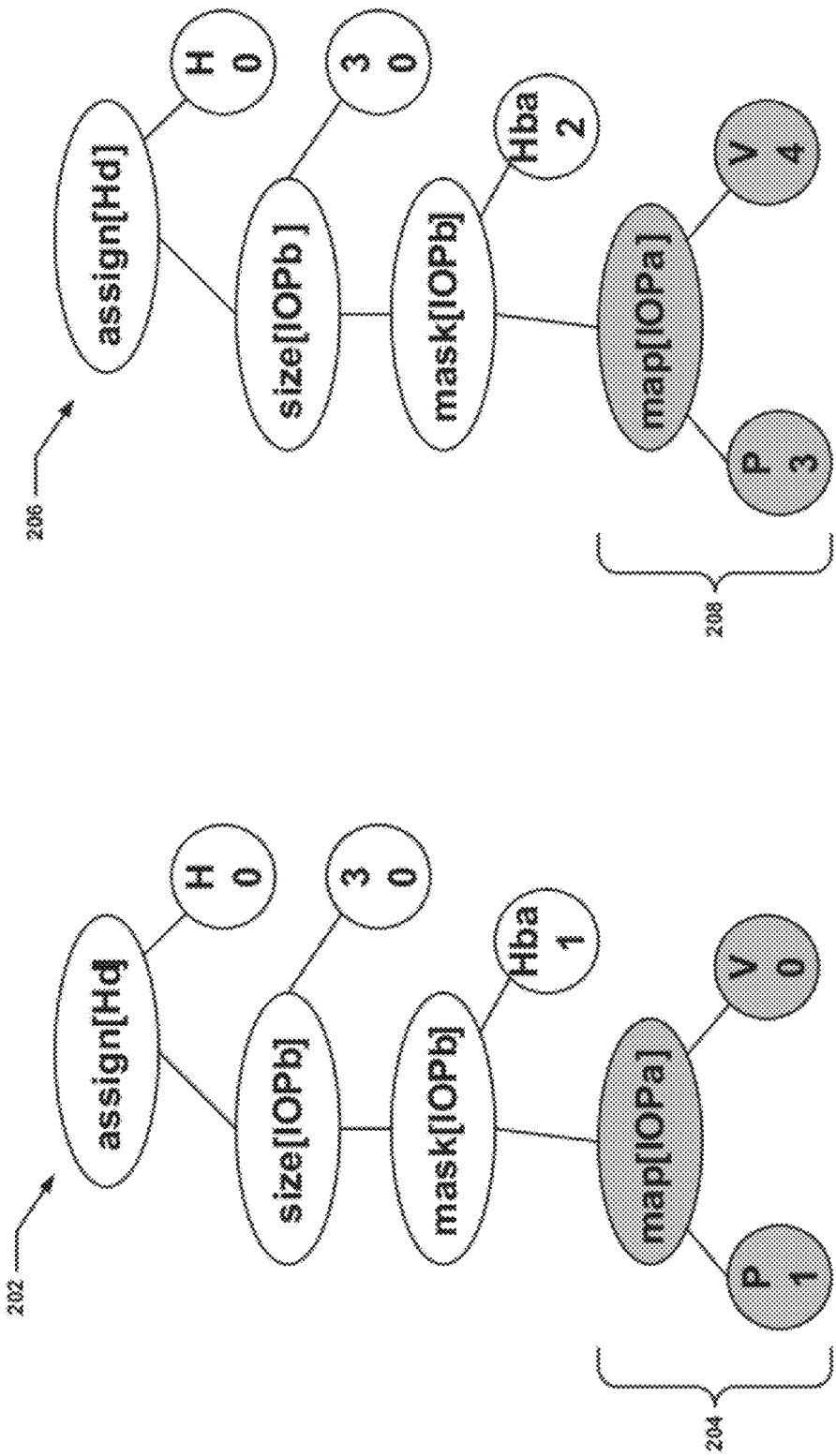
FIG. 9 is a diagram of a two plans as genetic programming parse trees before performing crossover.

As shown in the screen shot 180 of FIG. 9, after more evolving, the populations of plans have converged to a final set of preferred solutions having a single same cost of approximately 4.0 to implement. For this example, six generations of populations of plans were required to arrive at an optimal solution(s). This plan is the preferred solution for implementing the request in the most cost effective manner.

The converging from a first generation population of plans to an optimal plan was obtained by a process referred to as evolving. The evolving between plans can involve one or more techniques, the techniques including crossover, mutation, replication, reproduction, architecture altering operations and other evolving operations. Crossover is performed between two plans, to produce two different plans. Selection of these two plans may be accomplished by several techniques, including one referred to as Greedy Over Selection. Lower cost plans are chosen more often than higher cost plans to mutate and cross over with other chosen plans.

In order to perform crossover, a subtree of a first genetic programming parse tree (plan) corresponding to modeled assets and modeled tasks is identified. A subtree of a second genetic programming parse tree (plan) corresponding to modeled assets and modeled tasks is also identified. The subtree of the first genetic programming parse tree is swapped with the subtree of the second genetic programming parse tree within the first genetic programming parse tree. The subtree of the second genetic programming parse tree is swapped with the subtree of the first genetic programming parse tree within said second genetic programming parse tree. Thus, two new genetic programming parse trees (plans) are created, which are also possible solutions to the change request. The cost associated with these new trees is evaluated, and the evolving between different plans is carried out until some type of convergence is achieved.

Figure 10:
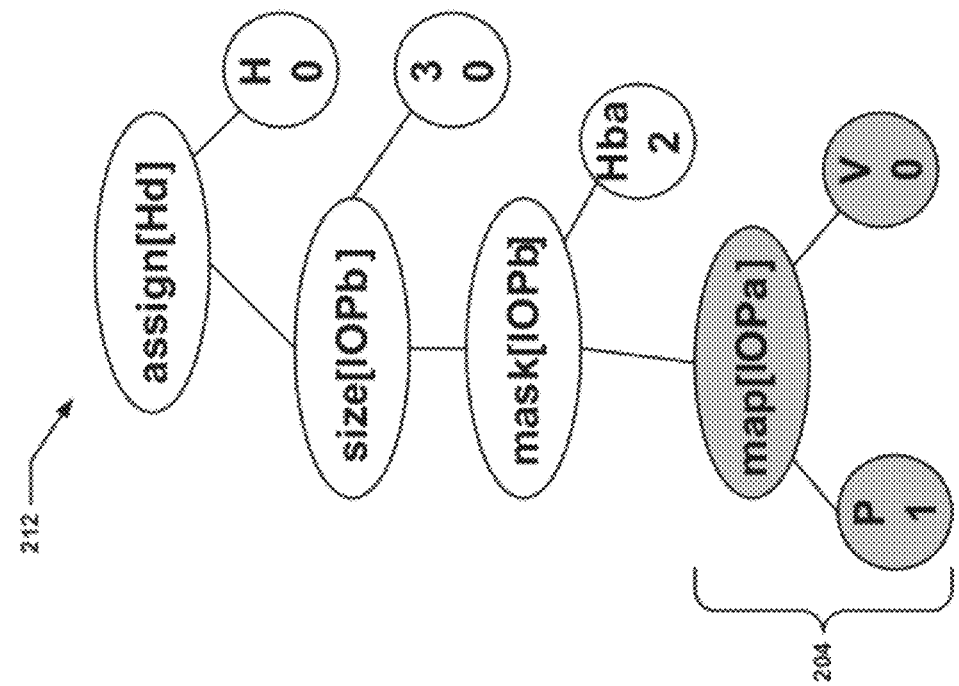
FIG. 10 is a diagram of a two plans as genetic programming parse trees after performing crossover.
Figure 10:
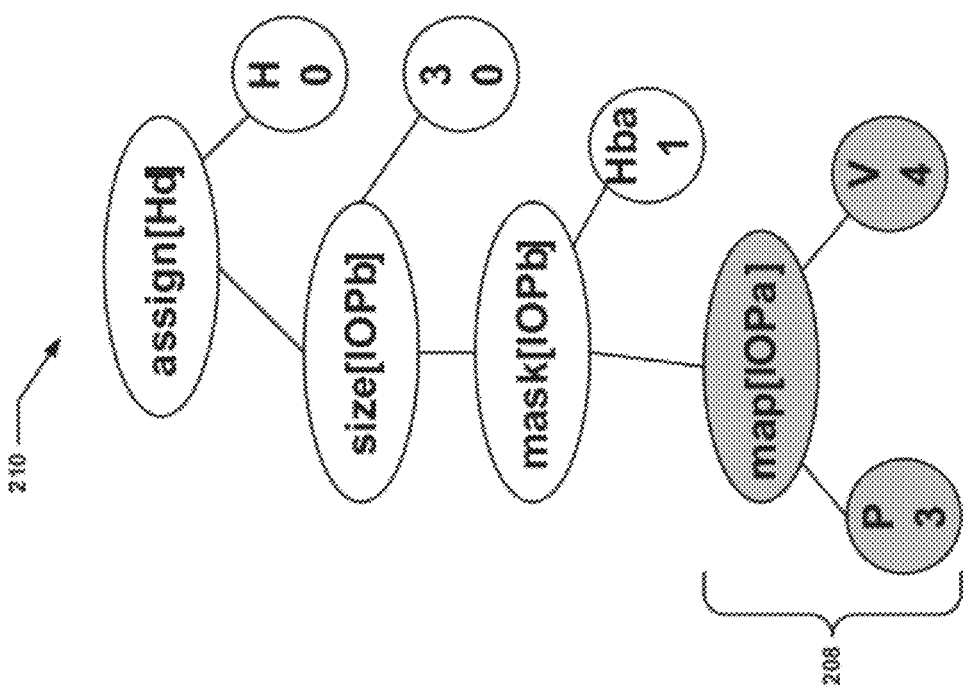

An example of evolving by way of performing crossover between two plans is shown in FIGS. 9 and 10. In FIG. 9, two plans are shown 202 and 206, both of which provide a solution to a change request. The plans were first developed as a solution to a provisioning request. The provisioning request for this example states:

Allocate to Host H0 a minimum of 30 GB of new storage.

Plan 202 is one solution to the request, and is shown as a genetic programming parse tree. Starting at the bottom, a port (P1) and a volume (V0) are mapped to provide an exported IO Path. The exported IO Path and Hba device (Hba1) are masked to produce an imported IO path. The imported IO path is assigned to a host (H0) at operation a Host Device, the host device having a capacity of 30 GB. Also shown is a second path 206. Both paths are part of the first generation population of plans. For this plan a port (P3) and a volume (V4) are mapped to provide an exported IO Path. The exported IO Path and Hba device (Hba2) are masked to produce an imported IO path. The imported IO path is assigned to a host (H0) at operation a Host Device, the host device having a capacity of 30 GB.

Path 202 includes a subtree 204, including port P1 and volume V0 mapped to provide an exported IO path. Similarly, path 206 includes a subtree 208 which includes port P3 and volume V4 mapped to provide an exported IO path. The subtree 204 of the first genetic programming parse tree 202 is swapped with the subtree 208 of the second genetic programming parse tree 206 within the first genetic programming parse tree. The subtree 208 of the second genetic programming parse tree 206 is swapped with the subtree 204 of the first genetic programming parse tree 202 within said second genetic programming parse tree 206. Thus, two new genetic programming parse trees (plans) are created, which are also possible solutions to the request. The resulting plans are shown in FIG. 10.

Referring now to FIG. 10, two new plans 210 and 212 are shown. After crossover was performed new path 210 now includes subtree 208. For this plan a port (P3) and a volume (V4) are mapped to provide an exported IO Path. The exported IO Path and Hba device (Hba1) are masked to produce an imported IO path. The imported IO path is assigned to a host (H0) at operation a Host Device, the host device having a capacity of 30 GB.

Similarly, new path 212 includes subtree 204. For this plan a port (P1) and a volume (V0) are mapped to provide an exported IO Path. The exported IO Path and Hba device (Hba2) are masked to produce an imported IO path. The imported IO path is assigned to a host (H0) at operation a Host Device, the host device having a capacity of 30 GB. These new paths may have different costs associated therewith. Also, these paths are now available to be used in performing crossover to determine a next generation of plans. Each of the plans (202, 208, 210, and 212) may have a different cost associated therewith. The plan with the lowest cost is the preferred plan. There may be no single plan or single associated strategy. There can be multiple plans and strategies that meet this convergence criteria. In that case the user can choose among an assortment of equally cost effective plans, or can decide to further constrain his request to narrow the alternatives. It is also possible for multiple plans to have a same cost, which is the lowest cost. In that scenario, any one of the plans having the lowest cost can be implemented.

Once the process of evolving has begun, it may be necessary to determine an appropriate time to stop evolving. This may occur after a predetermined number of generations of plans have been developed, or when a certain convergence point regarding the costs of the generation of plans is met, or as costs of all individuals don't vary by more than a delta, or that the chromosomes and/or individuals have reached a steady state composition, or a combination of all of these. This varies according to particular resources being modeled and time available to converge on a solution.

Figure 11A:
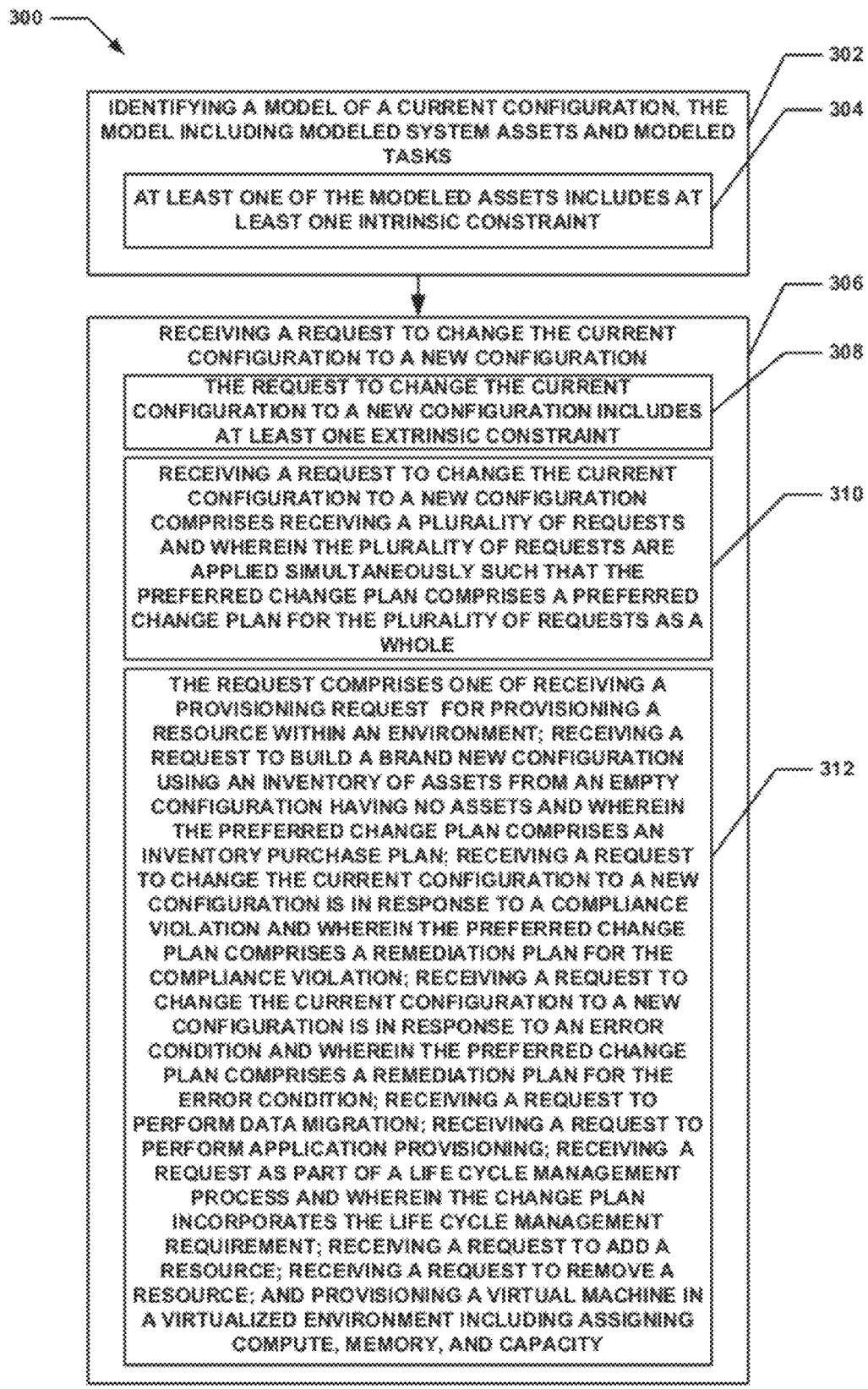
FIGS. 11A and 11B comprise flow diagrams of a particular embodiment of a method of computing a change plan in accordance with embodiments of the invention.
Figure 11B:
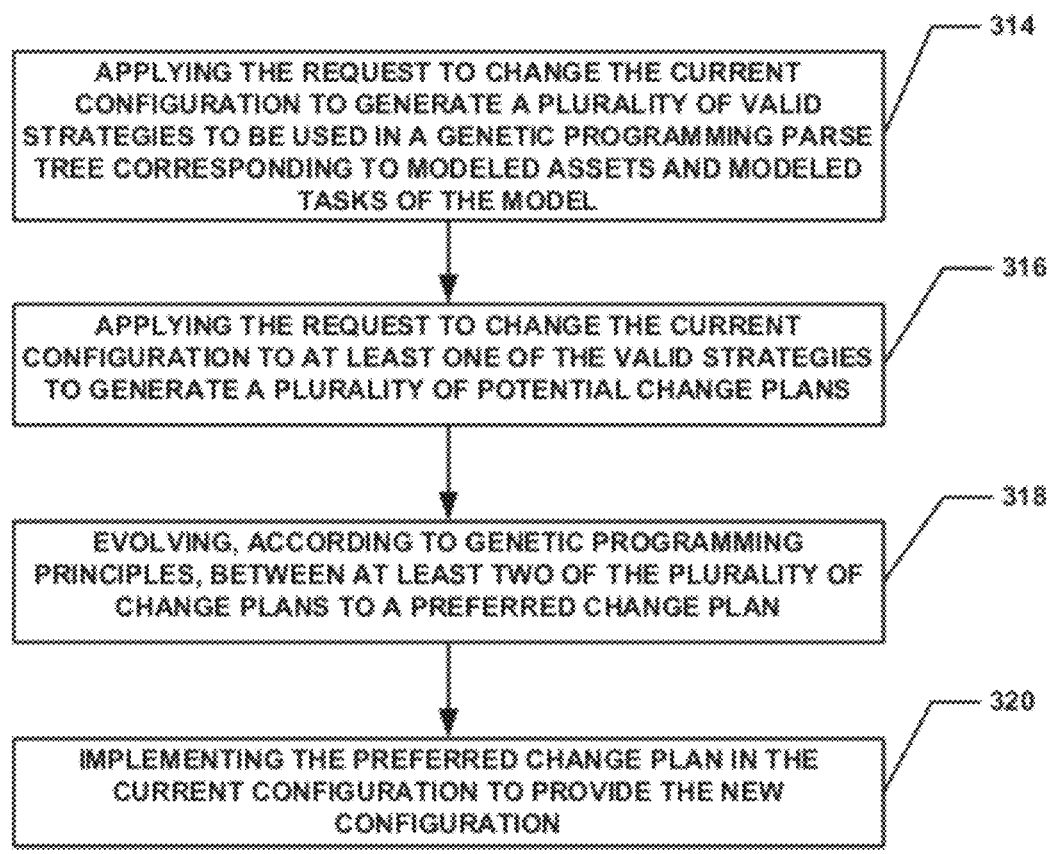
Figure 12:
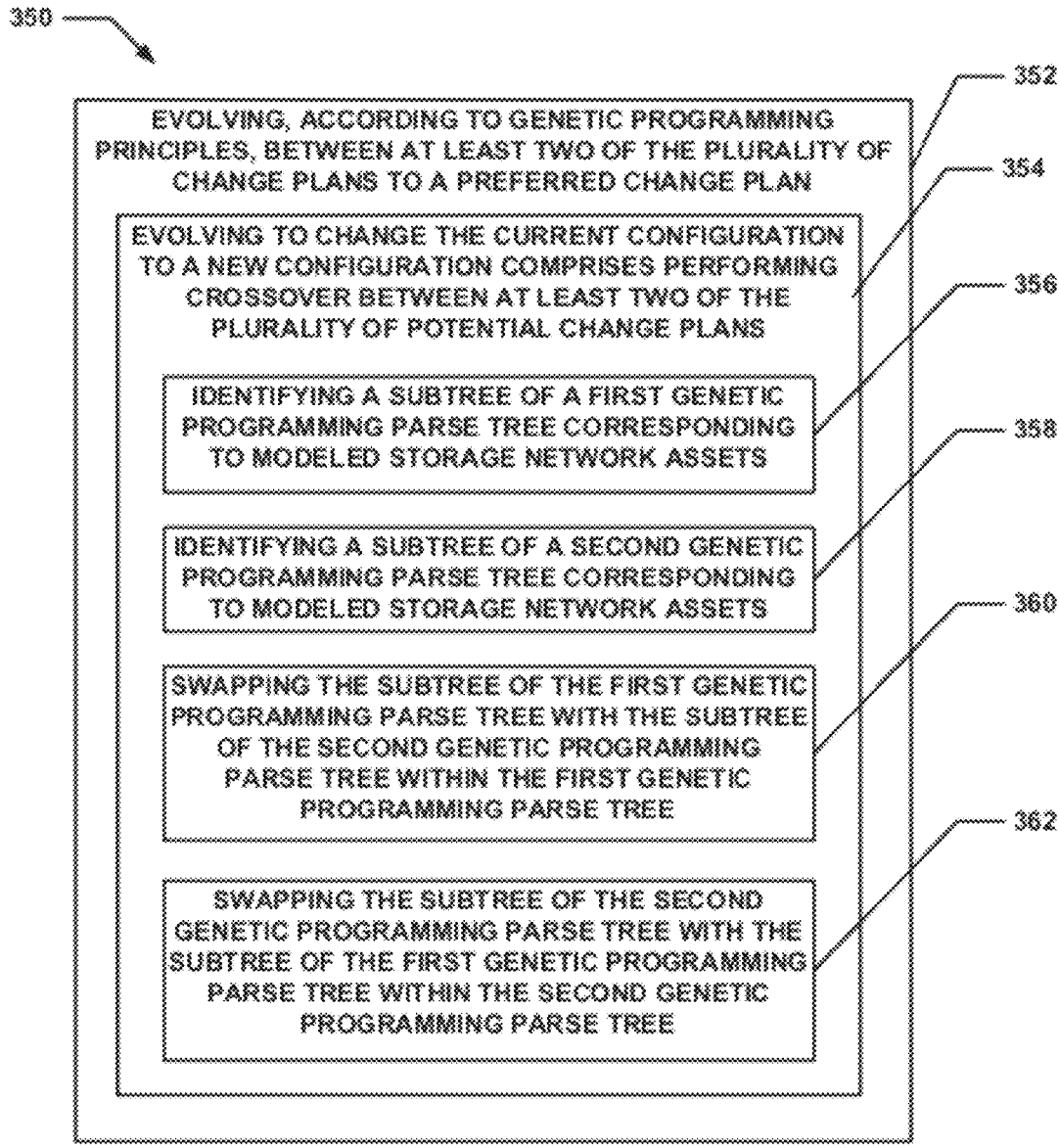
FIG. 12 is a flow diagram of a particular embodiment of a method of performing crossover in accordance with embodiments of the invention.

Flow diagrams of particular embodiments of the presently disclosed methods are depicted in FIGS. 11A, 11B, and 12. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring to now to FIGS. 11A and 11B, a particular embodiment of a method 300 for computing a change plan is shown. Method 300 begins with processing block 302 which discloses identifying a model of a current configuration, the model including modeled system assets and modeled tasks. In one embodiment this model is a Generalized Virtualizer Generic Data Path (GDP) model. As shown in processing block 304 at least one of the modeled assets and modeled tasks may include at least one intrinsic constraint.

Processing block 306 states receiving a request to change the current configuration to a new configuration. The space of potential instances becomes larger. A target is required, as that allows the user to extract the valid strategies, having the output of the root node equal to the target.

Processing block 310 recites receiving a request to change the current configuration to a new configuration comprises receiving a plurality of requests and wherein the plurality of requests are applied simultaneously such that the preferred change plan comprises a preferred change plan for the plurality of requests as a whole.

Processing block 312 discloses wherein the request to change the current configuration to a new configuration is selected from the group consisting of receiving a provisioning request for provisioning a resource within an environment; receiving a request to build a brand new configuration using an inventory of assets from an empty configuration having no assets and wherein the preferred change plan comprises an inventory purchase plan; receiving a request to change the current configuration to a new configuration is in response to a compliance violation and wherein the preferred change plan comprises a remediation plan for the compliance violation; receiving a request to change the current configuration to a new configuration is in response to an error condition and wherein the preferred change plan comprises a remediation plan for the error condition; receiving a request to perform data migration; receiving a request to perform application provisioning; receiving a request as part of a life cycle management process and wherein the change plan incorporates the life cycle management requirement; receiving a request to add a resource; receiving a request to remove a resource; and receiving a request to provision a virtual machine in a virtualized environment including assigning compute, memory, and capacity. While the above is a listing of various types of change requests, the present invention is not intended to be limited by the above list of possible change requests.

Processing continues with processing block 314 which discloses applying the request to change the current configuration to generate a plurality of valid strategies to be used in a genetic programming parse tree corresponding to modeled assets and modeled tasks of the model. A genetic programming parse tree includes modeled instances and atomic operations that either act directly on those instances or on output instances of previous atomic operations and as modeled instances that result from the actions. This can be thought of as a template that has model based entities (types/classes and tasks) which at this point is a template that will be filled with real world instances of those classes as selected to populate a specific strategy and then to be evaluated for fitness and cost.

Processing block 316 states applying the request to change the current configuration to at least one of the valid strategies to generate a plurality of potential change plans. Each plan is a potential solution to the request. A collection of change plans is referred to as a population. There may be several generations of populations of change plans that are produced until an optimal plan or set of plans are generated.

Processing block 318 recites evolving, according to genetic programming principles, between at least two of the plurality of change plans to a preferred change plan. Evolving can include performing crossover, mutation, replication, reproduction, architecture altering operations and other evolving operations. The plans will evolve over time using Darwinian principles (survival of the fittest).

Once the process of evolving has begun, it may be necessary to determine an appropriate time to stop evolving. This may occur after a predetermined number of generations of plans have been developed, or when a certain convergence point regarding the costs of the generation of plans is met, or as costs of all individuals don't vary by more than a delta, or that the chromosomes and/or individuals have reached a steady state composition, or a combination of all of these. This varies according to particular resources being modeled and time available to converge on a solution.

Processing block 320 discloses implementing the preferred change plan in the current configuration to provide the new configuration. The new configuration can be of many forms. For example, the new configuration can be a configuration that incorporates a provisioning request, a system that has been built from an inventory list of resources, a system configuration that meets a Service Level Agreement, a system configuration that meets security requirements, a system configuration that meets Quality of Service (QoS) guarantees for different types of data flowing through a network, a system configuration that meets fault tolerance requirements for providing system integrity, a system configuration that meets redundancy requirements, a system configuration that meets content management requirements or life cycle requirements, and the like.

Referring now to FIG. 12, a particular embodiment of a method 350 for performing crossover is shown. Method 350 begins with processing block 352, which discloses which evolving, according to genetic programming principles, between at least two of the plurality of change plans. As shown in processing block 354, the evolving to change the current configuration to a new configuration comprises performing crossover between at least two of the plurality of potential change plans.

Processing block 356 states identifying a subtree of a first genetic programming parse tree corresponding to modeled storage network assets and modeled tasks. Processing block 358 recites identifying a subtree of a second genetic programming parse tree corresponding to modeled storage network assets and modeled tasks. Processing block 360 discloses swapping the subtree of the first genetic programming parse tree with the subtree of the second genetic programming parse tree within the first genetic programming parse tree. Processing block 362 discloses swapping the subtree of the second genetic programming parse tree with the subtree of the first genetic programming parse tree within the second genetic programming parse tree.

Figure 13:
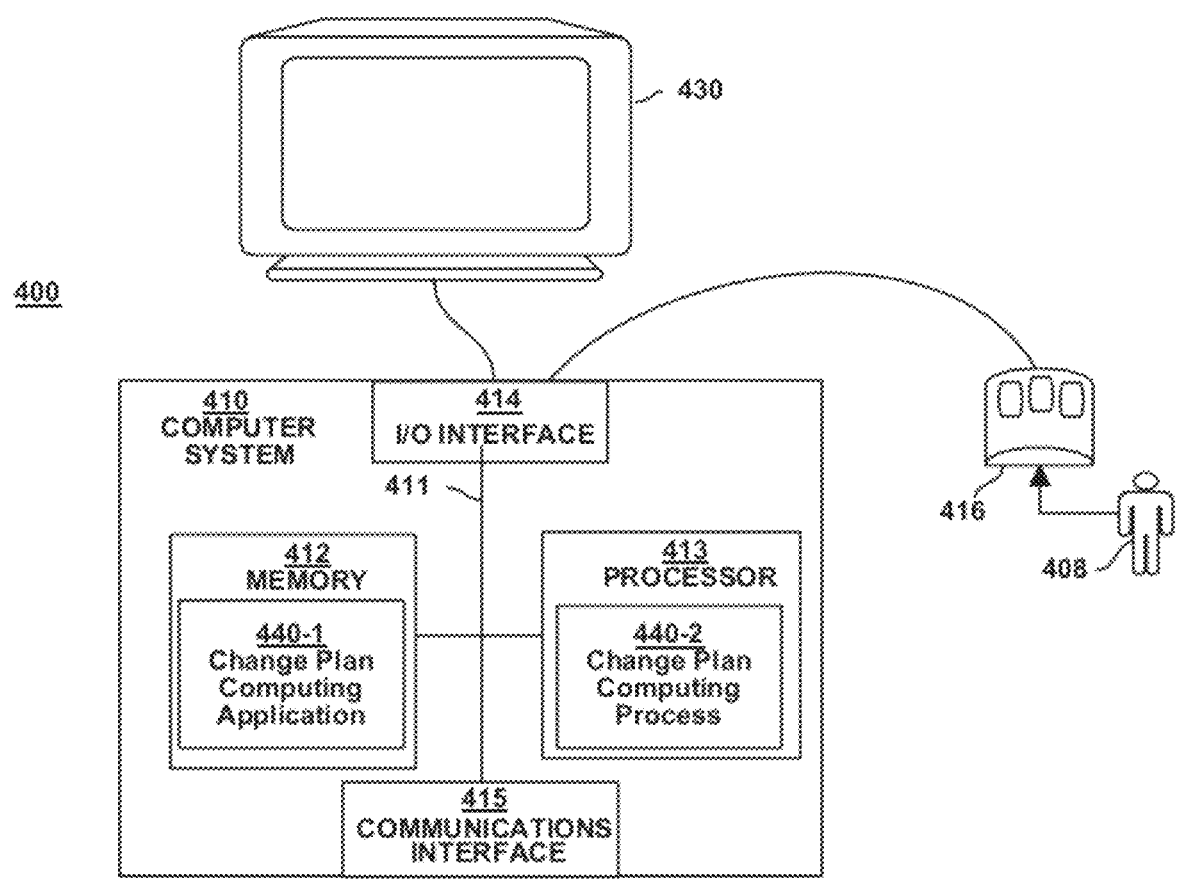
FIG. 13 illustrates an example computer system architecture for a computer system that performs computation of a change plan in accordance with embodiments of the invention.

FIG. 13 is a block diagram illustrating an example computer system 400 for implementing change plan computing function 440 and/or other related processes to carry out the different functionality as described herein.

As shown, computer system 400 of the present example includes an interconnect 411 that couples a memory system 412 and a processor 413 an input/output interface 414, and a communications interface 415. Also shown are in input control device 416 operable by a user 408.

As shown, memory system 412 is encoded with change plan computing application 440-1. Change plan computing application 440-1 can be embodied as software code such as data and/or logic instructions (e.g., code stored in the memory or on another computer readable medium such as a disk) that support functionality according to different embodiments described herein.

During operation, processor 413 of computer system 400 accesses memory system 412 via the interconnect 411 in order to launch, run, execute, interpret or otherwise perform the logic instructions of the change plan computing application 440-1. Execution of change plan computing application 440-1 produces processing functionality in change plan computing process 440-2. In other words, the change plan computing process 440-2 represents one or more portions of the change plan computing application 440-1 (or the entire application) performing within or upon the processor 413 in the computer system 400.

It should be noted that, in addition to the change plan computing process 440-2, embodiments herein include the change plan computing application 440-1 itself (i.e., the unexecuted or non-performing logic instructions and/or data). The change plan computing 440-1 can be stored on a computer readable medium such as a floppy disk, hard disk, or optical medium. The change plan computing application 440-1 can also be stored in a memory type system such as in firmware, read only memory (ROM), or, as in this example, as executable code within the memory system 412 (e.g., within Random Access Memory or RAM).

In addition to these embodiments, it should also be noted that other embodiments herein include the execution of change plan computing application 440-1 in processor 413 as the change plan computing 440-2. Those skilled in the art will understand that the computer system 400 can include other processes and/or software and hardware components, such as an operating system that controls allocation and use of hardware resources associated with the computer system 400.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of computing a change plan, the method comprising:

identifying a model of a current configuration, said model including modeled system assets and modeled tasks;

receiving a request to change the current configuration to a new configuration;

applying said request to change the current configuration to generate a plurality of valid strategies to be used in a genetic programming parse tree corresponding to modeled assets and modeled tasks of said model;

applying said request to change the current configuration to at least one of said valid strategies to generate a plurality of potential change plans; and evolving, according to genetic programming principles, between at least two of said plurality of change plans to a preferred change plan to migrate from the current configuration to a desired configuration;

wherein said request to change the current configuration to a new configuration is selected from the group consisting of receiving a provisioning request for provisioning a resource within an environment; receiving a request to build a brand new configuration using an inventory of assets from an empty configuration having no assets and wherein said preferred change plan comprises an inventory purchase plan; receiving a request to change the current configuration to a new configuration is in response to a compliance violation and wherein said preferred change plan comprises a remediation plan for said compliance violation; receiving a request to change the current configuration to a new configuration is in response to an error condition and wherein said preferred change plan comprises a remediation plan for said error condition; receiving a request to perform data migration; receiving a request to perform application provisioning; receiving a request as part of a life cycle management process and wherein said change plan incorporates said life cycle management requirement; receiving a request to add a resource; receiving a request to remove a resource; and provisioning a virtual machine in a virtualized environment including assigning compute, memory, and capacity.

2. The method of claim 1 further comprising implementing said preferred change plan in said current configuration to provide said new configuration.

3. The method of claim 1 wherein said request to change the current configuration to a new configuration includes at least one extrinsic constraint.

4. The method of claim 1 wherein at least one of said modeled assets and modeled tasks includes at least one intrinsic constraint.

5. The method of claim 1 wherein said evolving to change the current configuration to a new configuration comprises performing at least one of the group comprising crossover, mutation, replication, reproduction, and architecture altering operations.

6. The method of claim 5 wherein said performing crossover comprises:

identifying a subtree of a first genetic programming parse tree corresponding to modeled system assets and modeled tasks;

identifying a subtree of a second genetic programming parse tree corresponding to modeled system assets and modeled tasks;

swapping said subtree of said first genetic programming parse tree with said subtree of said second genetic programming parse tree within said first genetic programming parse tree; and swapping said subtree of said second genetic programming parse tree with said subtree of said first genetic programming parse tree within said second genetic programming parse tree.

7. The method of claim 1 wherein each of said plurality of change plans has a cost associated therewith wherein said preferred change plan is based on a lowest cost associated therewith.

8. The method of claim 7 wherein said cost is based on a user-defined cost function.

9. The method of claim 1 receiving a request to change the current configuration to a new configuration comprises receiving a plurality of requests and wherein said plurality of requests are applied simultaneously such that the preferred change plan comprises a preferred change plan for the plurality of requests as a whole.

10. A non-transitory computer readable medium having computer readable code thereon for computing a change plan, the medium comprising:

instructions for identifying a model of a current configuration, said model including modeled system assets and modeled tasks;

instructions for receiving a request to change the current configuration to a new configuration;

instructions for applying said request to change the current configuration to generate a plurality of valid strategies to be used in a genetic programming parse tree corresponding to modeled assets and modeled tasks of said model;

instructions for applying said request to change the current configuration to at least one of said valid strategies to generate a plurality of potential change plans; and instructions for evolving, according to genetic programming principles, between at least two of said plurality of change plans to a preferred change plan;

wherein said instructions for a request to change the current configuration to a new configuration are selected from the group consisting of instructions for receiving a provisioning request for provisioning a resource within an environment; instructions for receiving a request to build a brand new configuration using an inventory of assets from an empty configuration having no assets and wherein said preferred change plan comprises an inventory purchase plan; instructions for receiving a request to change the current configuration to a new configuration is in response to a compliance violation and wherein said preferred change plan comprises a remediation plan for said compliance violation; instructions for receiving a request to change the current configuration to a new configuration is in response to an error condition and wherein said preferred change plan comprises a remediation plan for said error condition; instructions for receiving a request to perform data migration; instructions for receiving a request to perform application provisioning; receiving a request as part of a life cycle management process and wherein said change plan incorporates said life cycle management requirement; instructions for receiving a request to add a resource; instructions for receiving a request to remove a resource; and instructions for provisioning a virtual machine in a virtualized environment including assigning compute, memory, and capacity.

11. The non-transitory computer readable medium of claim 10 further comprising instructions for implementing said preferred change plan in said current configuration to provide said new configuration.

12. The non-transitory computer readable medium of claim 10 wherein said instructions for a request to change the current configuration to a new configuration includes at least one extrinsic constraint.

13. The non-transitory computer readable medium of claim 10 wherein at least one of said modeled assets and modeled tasks includes at least one intrinsic constraint.

14. The non-transitory computer readable medium of claim 10 wherein said instructions for evolving to change the current configuration to a new configuration comprises instructions for performing at least one of the group comprising crossover, mutation, replication, reproduction, and architecture altering operations.

15. The non-transitory computer readable medium of claim 14 wherein said instructions for performing crossover comprises:
- instructions for identifying a subtree of a first genetic programming parse tree corresponding to modeled system assets and modeled tasks;
- instructions for identifying a subtree of a second genetic programming parse tree corresponding to modeled system assets and modeled tasks;
- instructions for swapping said subtree of said first genetic programming parse tree with said subtree of said second genetic programming parse tree within said first genetic programming parse tree; and
- instructions for swapping said subtree of said second genetic programming parse tree with said subtree of said first genetic programming parse tree within said second genetic programming parse tree.

16. The non-transitory computer readable medium of claim 10 wherein each of said plurality of change plans has a cost associated therewith wherein said preferred change plan is based on a lowest cost associated therewith.

17. The non-transitory computer readable medium of claim 16 wherein said cost is based on a user-defined cost function.

18. The non-transitory computer readable medium of claim 10 wherein said instructions for receiving a request to change the current configuration to a new configuration comprises instructions for receiving a plurality of requests and wherein said plurality of requests are applied simultaneously such that the preferred change plan comprises a preferred change plan for the plurality of requests as a whole.

19. A computer system comprising:
- a memory;
- a processor;
- a communications interface;
- an interconnection mechanism coupling the memory, the processor and the communications interface; and
- wherein the memory is encoded with an application computing a change plan, that when performed on the processor, provides a process for processing information, the process causing the computer system to perform the operations of:
- identifying a model of a current configuration, said model including modeled system assets and modeled tasks;
- receiving a request to change the current configuration to a new configuration;
- applying said request to change the current configuration to generate a plurality of valid strategies to be used in a genetic programming parse tree corresponding to modeled assets and modeled tasks of said model;
- applying said request to change the current configuration to at least one of said valid strategies to generate a plurality of potential change plans; and
- evolving, according to genetic programming principles, between at least two of said plurality of change plans to a preferred change plan;
- wherein said request to change the current configuration to a new configuration is selected from the group consisting of receiving a provisioning request for provisioning a resource within an environment; receiving a request to build a brand new configuration using an inventory of assets from an empty configuration having no assets and wherein said preferred change plan comprises an inventory purchase plan; receiving a request to change the current configuration to a new configuration is in response to a compliance violation and wherein said preferred change plan comprises a remediation plan for said compliance violation; receiving a request to change the current configuration to a new configuration is in response to an error condition and wherein said preferred change plan comprises a remediation plan for said error condition; receiving a request to perform data migration; receiving a request to perform application provisioning; receiving a request as part of a life cycle management process and wherein said change plan incorporates said life cycle management requirement; receiving a request to add a resource; receiving a request to remove a resource; and provisioning a virtual machine in a virtualized environment including assigning compute, memory, and capacity.

* * * * *